(No Model.)

W. H. PICKERING.
MOTOR VEHICLE.

No. 603,047. Patented Apr. 26, 1898.

4 Sheets—Sheet 1.

WITNESSES:

INVENTOR
William H. Pickering
BY
Maynadier & Mitchell,
ATTORNEYS.

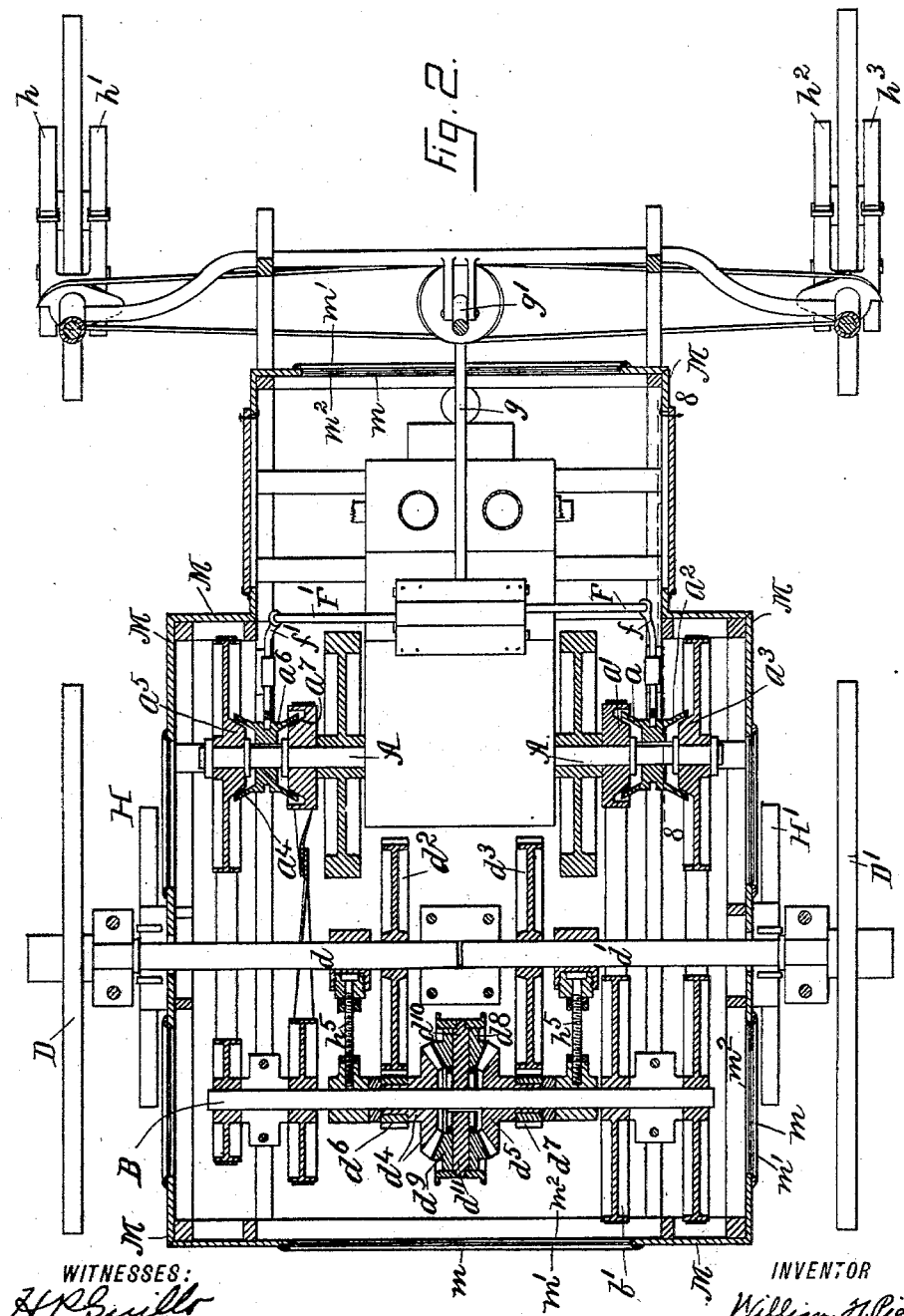

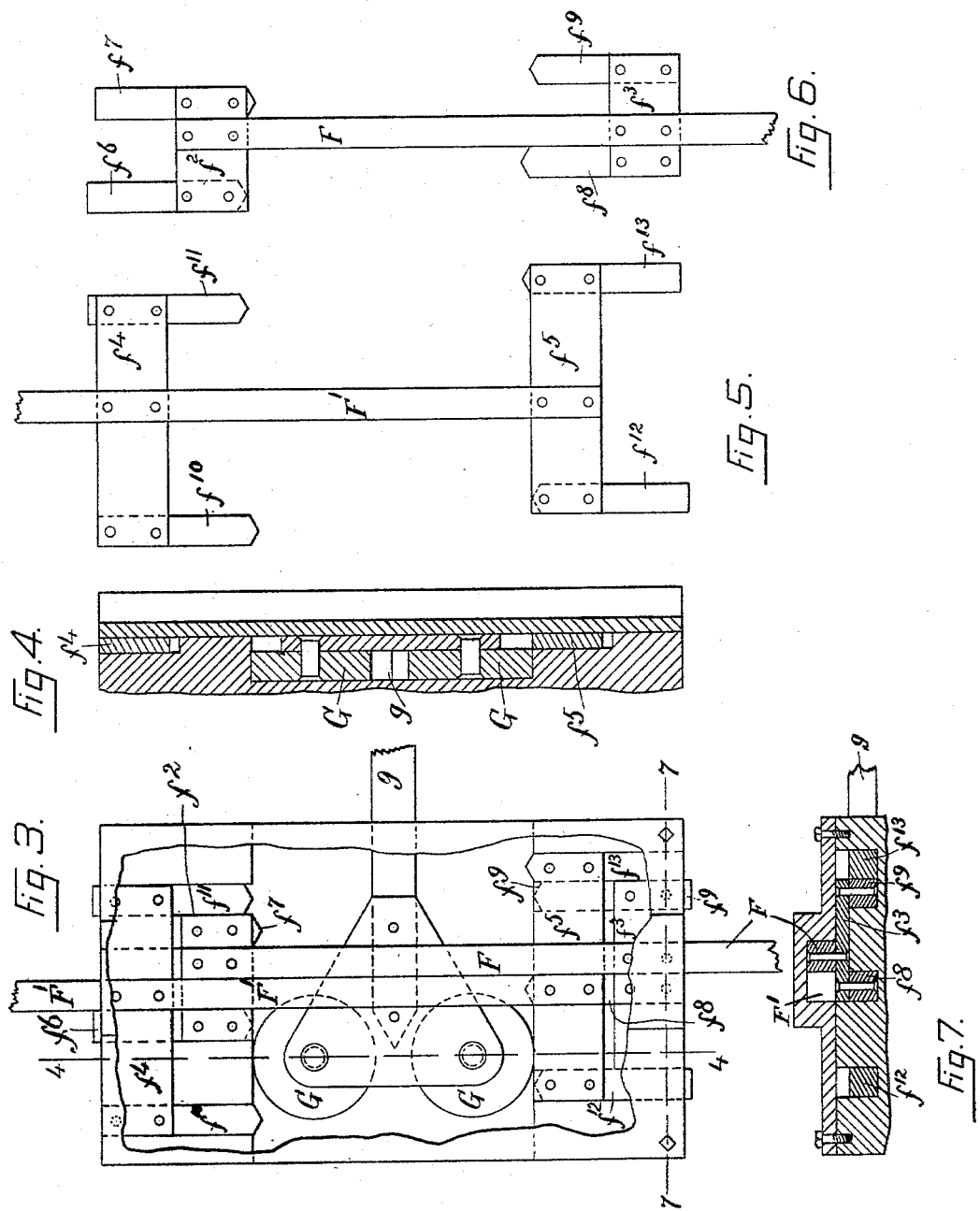

(No Model.) 4 Sheets—Sheet 4.

W. H. PICKERING.
MOTOR VEHICLE.

No. 603,047. Patented Apr. 26, 1898.

WITNESSES:
H. P. Guillo
John R. Snow.

INVENTOR
William H. Pickering
BY
Maynadier & Mitchell
ATTORNEYS.

UNITED STATES PATENT OFFICE.

WILLIAM HENRY PICKERING, OF CAMBRIDGE, MASSACHUSETTS.

MOTOR-VEHICLE.

SPECIFICATION forming part of Letters Patent No. 603,047, dated April 26, 1898.

Application filed August 31, 1896. Serial No. 604,381. (No model.)

*To all whom it may concern:*

Be it known that I, WILLIAM HENRY PICKERING, of Cambridge, in the county of Middlesex and State of Massachusetts, have invented an Improved Motor-Vehicle, of which the following is a specification, reference being had to the accompanying drawings, in which—

Figure 1:
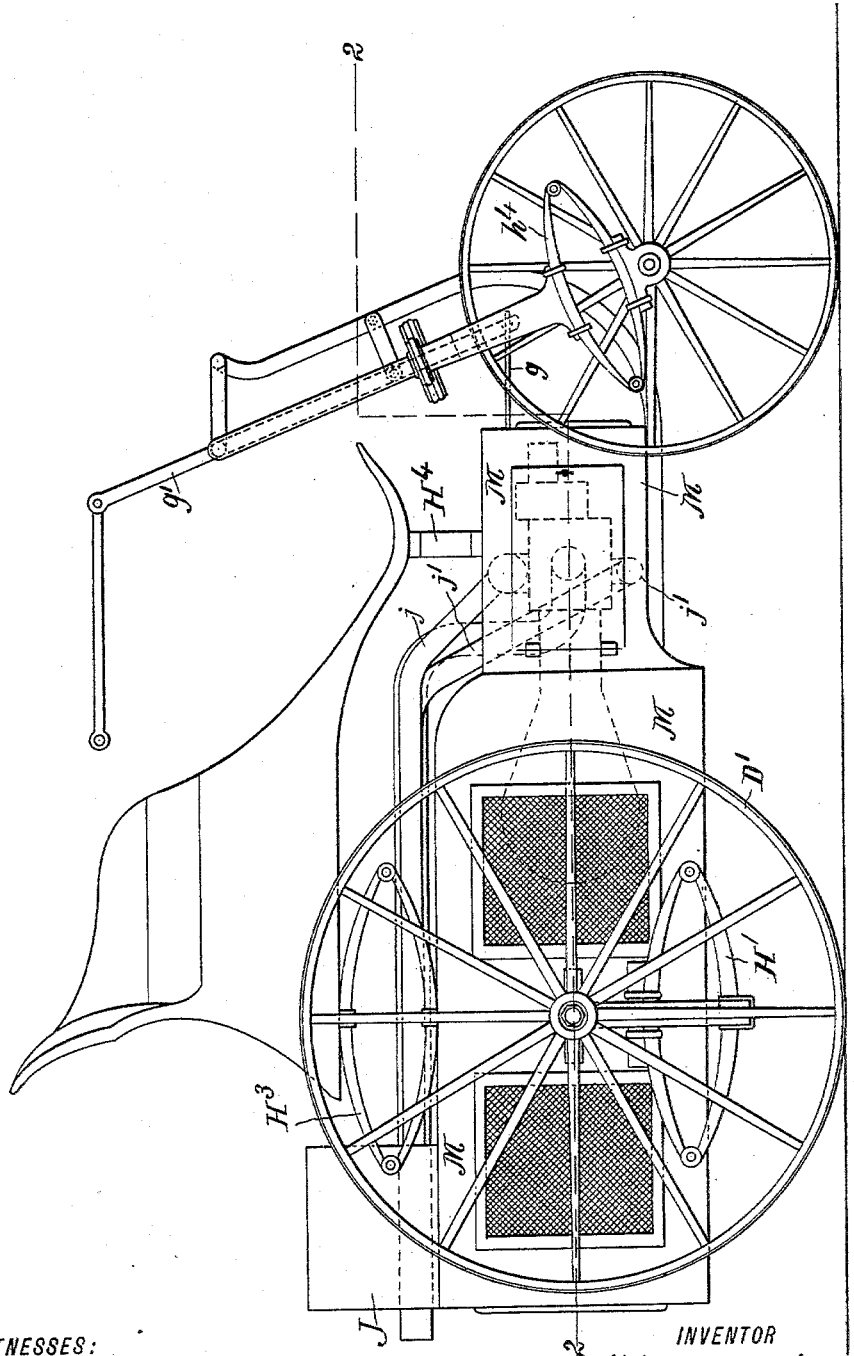
Figure 8:
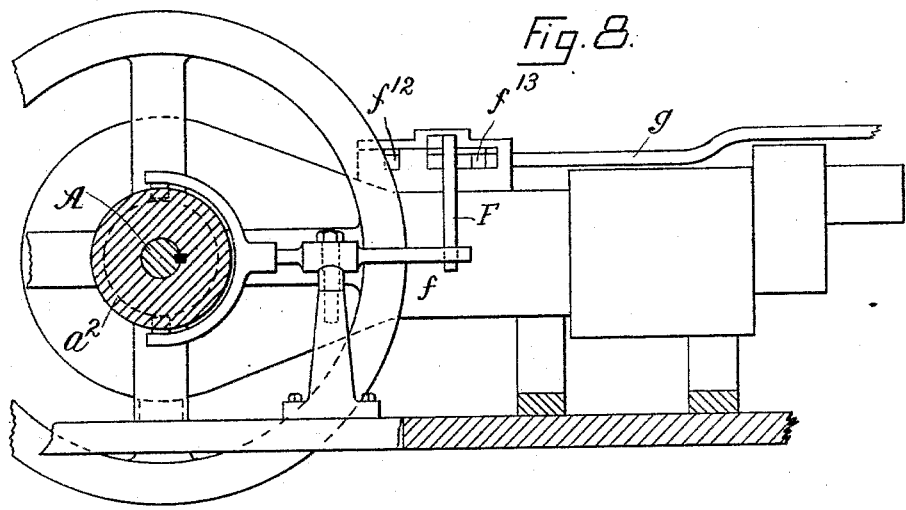
Figure 9:
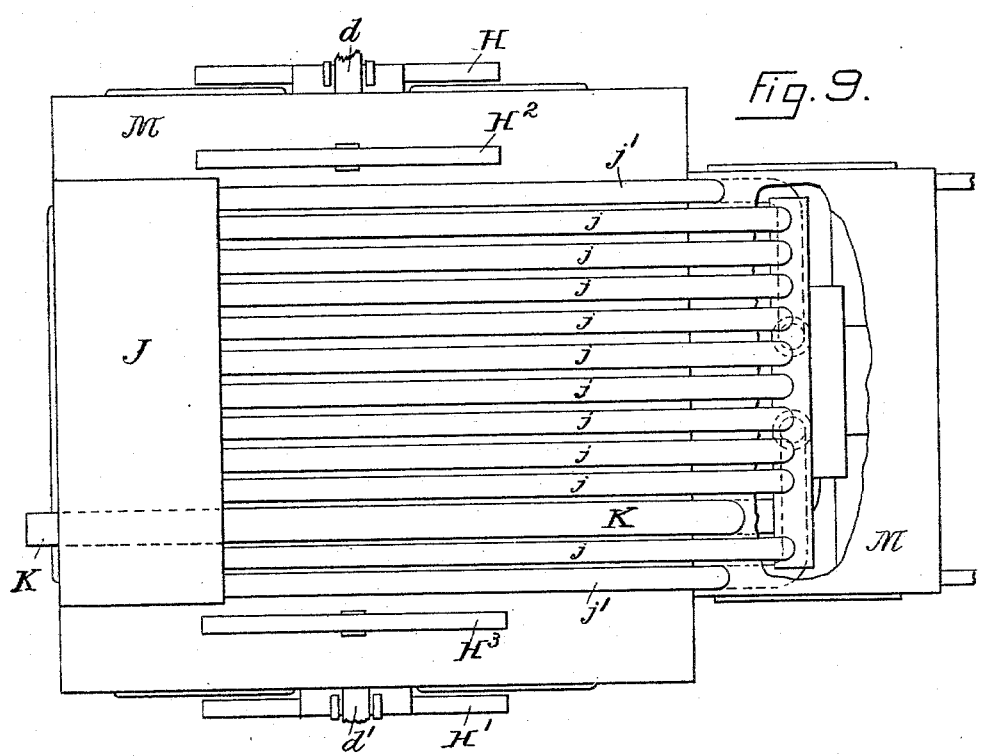

Figure 1 is an elevation, and Fig. 2 a section, on line 2 2 of Fig. 1. Figs. 3, 4, 5, 6, 7, and 8 are details, on a larger scale, illustrating the connections between the motor-shaft and the driving-wheels of the vehicle, Fig. 3 being a plan of the mechanism by which the clutches are connected and disconnected, Fig. 4 a section on line 4 4 of Fig. 3, Figs. 5 and 6 detailed views of the two slides by which the clutch-levers are operated, Fig. 7 a section on line 7 7 of Fig. 3, and Fig. 8 a section on line 8 8 of Fig. 2. Fig. 9 is a partial plan illustrating the circulating-pipes of the motor.

I will first explain the means by which the power of the motor is applied to the driving-wheels.

In the drawings, A is the motor-shaft, provided with four pairs of clutches $a\,a'$, $a^2\,a^3$, $a^4\,a^5$, and $a^6\,a^7$. Each clutch member $a$, $a^2$, $a^4$, and $a^6$ revolves with the motor-shaft, but is under the control of the operator through the clutch-operating mechanism, while each clutch member $a'$, $a^3$, $a^5$, and $a^7$ is loose on the motor-shaft and connected by belt and pulleys or other like connection with the counter-shaft B, so that when clutch member $a$, revolving with the motor-shaft A, is engaged with its companion $a'$ the speed of the counter-shaft B will be determined by the speed of the motor-shaft A and the proportions of the pulley fast to member $a'$ and its companion pulley $b'$, fast to counter-shaft B, and the clutch member $a$ and $a'$ will be engaged on starting the vehicle, for the speed of motor-shaft A is practically constant, and it is desirable that the speed of the counter-shaft B should be at its minimum in starting the vehicle, for the counter-shaft B is geared to axles $d\,d'$ of the driving-wheels D D' or otherwise connected to drive those wheels, and in starting the vehicle the wheels D D' should have their minimum speed. After the vehicle is thus started the clutch members $a$ and $a'$ are disengaged and the clutch members $a^2$ and $a^3$ engaged, thereby increasing the speed of the counter-shaft B and of the driving-wheels D D', and if a still greater speed be desired the clutch members $a^2$ and $a^3$ are disengaged and $a^4$ and $a^5$ engaged, giving the maximum speed to counter-shaft B and driving-wheels D D'.

When only the clutch members $a^6$ and $a^7$ are engaged, the power of the motor is applied to back the vehicle without reversing the motor-shaft A, as will be clear from Fig. 2.

The axles $d\,d'$ are separate, and the counter-shaft B is connected to those axles by the gears $d^2\,d^3$, fast, respectively, to axles $d$ and $d'$, and the well-known equalizing-gearing, composed of the gears $d^4\,d^5$, loose on the counter-shaft B, but fast to the gears $d^6\,d^7$, which mesh with the gears $d^2\,d^3$, and driven by the gears $d^8\,d^9$, whose studs $d^{10}\,d^{11}$ are fast to counter-shaft B.

The mechanism by which the movable clutch members are controlled by the operator constitutes one feature of my invention, and consists of two sliding bars, each controlling a clutch-lever and means under the control of the operator for moving either bar endwise, as will now be more fully described by reference to the drawings, where the sliding bars F F' are shown bent down, each at its outer end, (see Figs. 2 and 8,) to engage the clutch-levers $f\,f'$, so that when bar F is in its intermediate position the clutch-lever $f$ causes the clutch members $a$ and $a^2$ to remain disengaged from the members $a'$ and $a^3$; but when bar F is moved out the clutch $a\,a'$ operates to start the vehicle, and when bar F is moved in the clutch $a^2\,a^3$ operates to increase the speed of the vehicle and to disengage clutch $a\,a'$. When bar F' is moved in, the the high-speed clutch $a^4\,a^5$ operates, and when bar F' is moved out the backing-clutch $a^6\,a^7$ operates. By reference to Figs. 3, 5, and 6 it will be seen that each bar F F' carries two cross-heads $f^2\,f^3$ and $f^4\,f^5$ and each head carries two lugs $f^6, f^7, f^8, f^9, f^{10}, f^{11}, f^{12}$, and $f^{13}$, these lugs being in the same plane as the antifriction-wheels G, carried by the rod $g$, which is moved endwise by the lever $g'$. The parts are in the position shown in the drawings when the vehicle is at rest, and to start the vehicle the upper end of the lever $g'$ is moved to cause the wheels G to engage lug $f^8$ and force bar F out to operate clutch $a$ $a'$. A further movement of lever $g'$ causes wheels G to engage lug $f^7$ and force bar F in and disengage $a$ $a'$ and engage $a^2$ $a^3$ to increase the speed. A still further movement of lever $g'$ causes wheels G to engage lug $f^9$ and force bar F to its intermediate position, and a still further movement of lever $g'$ causes wheels G to engage lug $f^{13}$ and force bar F' in and engage $a^4$ $a^5$ to give full speed; but when lug $f^{13}$ is moved out its opposed lug $f^{11}$ is moved in, so that a slight reverse motion of lever $g'$ will cause wheels G to engage lug $f^{11}$ and move bar F' to its intermediate position, thus disengaging $a^4$ $a^5$. A further reverse motion of lever $g'$ will cause wheels G to engage lug $f^7$ and force bar F in and engage $a^2$ $a^3$. A still further reverse motion of lever $g'$ disengages clutch $a^2$ $a^3$ by the action of wheels G on lug $f^8$ and also engages $a$ $a'$, and a still further reverse motion of lever $g'$ causes wheels G to engage lug $f^6$ and disengage $a$ $a'$. To back the vehicle, lever $g'$ is moved to cause wheels G to engage lug $f^{10}$ and force bar F' out and thereby engage backing-clutch $a^6$ $a^7$; but this motion of bar F' carries its opposed lug $f^{12}$ in, so that when wheels G are moved back to the position shown in Fig. 3 the backing-clutch $a^6$ $a^7$ is disengaged by the action of wheels G on lug $f^{12}$. The lugs $f^6$, $f^9$, $f^{11}$, and $f^{12}$ return their bars F F' to their intermediate positions. The lug $f^{10}$ causes the engagement of the backing-clutch $a^6$ $a^7$, $f^{13}$ causes the engagement of the high-speed clutch $a^4$ $a^5$, the lug $f^7$ disengages $a$ $a'$ and engages $a^2$ $a^3$, and the lug $f^8$ disengages $a^2$ $a^3$ and engages $a$ $a'$.

In order to keep the gears $d^2$, $d^3$, $d^6$, and $d^7$ or equivalent connections between the counter-shaft B and the driving-wheels D D' from being injured by the relative motions between the axles of wheels D D' and countershaft B, due to the fact that the motor is supported wholly on springs, I link shaft B to axle $d$ $d'$ of wheels D D' by links $h^5$, so that the distance between the shaft B and axle $d$ $d'$ cannot vary materially, as the springs H H' and $h$ $h'$ $h^2$ $h^3$ yield under the shocks and jars to which the motor and its frame are subjected.

The springs supporting the body of the vehicle are marked $H^2$, $H^3$, and $H^4$, and I prefer two rear springs $H^2$ $H^3$ and a single front spring $H^4$. It will be seen that the springs H H' $h$ $h'$ $h^2$ $h^3$ not only shield the motor from injury, but also aid the springs $H^2$, $H^3$, and $H^4$ in supporting the body of the vehicle, making the vehicle more comfortable for the occupants as well as making a more durable vehicle.

Another feature of my invention relates to preventing the undue heating of the water used for cooling the cylinder and also to reducing the quantity of water required for that purpose to the minimum. I do this by using a reservoir connected to the water-jacket by upflow and downflow pipes or passages the same as other well-known apparatuses for giving the water a circulation due to differences in temperature, except that the upflowing water passes through a series of small pipes arranged in the general form of a radiator having a very large surface in contact with the atmosphere, the result being that as soon as the water in the water-jacket becomes heated materially above the temperature of the atmosphere a current of water is established from the water-jacket up through the radiator to the reservoir and down from the reservoir to the water-jacket, and this circulation grows more rapid as the temperature of the water in the jacket increases until the rate of flow becomes sufficient to prevent the further increase of temperature of the water in the jacket, for during the passage of the water through the radiator a large part of the heat obtained from the cylinder is radiated away.

I am aware that a zigzag pipe has been connected at both ends with the water-jacket, as shown in the patent to Benz, No. 385,087, dated June 26, 1888, and that a blower has been used to cool the water in the reservoir, as shown in the patent to Lewis, No. 545,962, dated September 10, 1895, and disclaim all shown in these patents.

In the drawings the reservoir J is supported on the casing of the motor and the radiator-pipes $j$ are arranged between the casing and the body of the vehicle, so that when the vehicle is running the radiator-pipes $j$ will be kept comparatively cool by a large and constant supply of fresh air. The downflow-pipes $j'$ are of the usual construction. The pipe K is the exhaust-pipe of the motor.

Another feature of my invention relates to the casing M of the motor, and consists in a motor whose casing M has ventilating-apertures covered with a screen composed of small-meshed sheet material $m$, such as a thin lap or bat of fibrous material or woven material with a small mesh confined between two sheets $m'$ $m^2$ of wire-netting or other stout fabric with a larger mesh, the purpose being to provide a large current of fresh air through the vehicle, and yet to exclude the dust caused by the motion of the vehicle. Casing the motor of a motor-vehicle to exclude the dust is practically essential, but is highly objectionable when the motor is a heat-engine, and this feature of my invention, whereby the dust is practically excluded, and yet the atmosphere within the casing is not unduly heated, is a matter of very considerable practical importance in the construction of motor-vehicles.

What I claim as my invention is—

1. In a motor-vehicle a clutch-operating mechanism consisting of the sliding bars, F F'; the clutch-levers $f$ $f'$; and means under the control of the operator for moving either sliding bar endwise, all combined to operate substantially as described.

2. In a motor-vehicle the combination of the water-jacket of the motor; a reservoir to supply that jacket elevated above the jacket; supply-pipes $j'$ from the reservoir to the jacket and a plurality of upflow-pipes $j$ from the jacket to the reservoir, the pipes $j$ arranged to form a radiator and thus facilitate the circulation of the water substantially as described.

3. In a motor-vehicle a motor with a casing M, with ventilating-apertures covered with a screen composed of small-mesh fabric $m$, between two sheets $m'$ $m^2$ of fabric of a larger mesh, substantially as and for the purpose specified.

WILLIAM HENRY PICKERING.

Witnesses:
JOHN R. SNOW,
H. P. GUILLO.